(No Model.)

G. W. LEWIS.
GAS OR VAPOR ENGINE.

No. 583,399.

Patented May 25, 1897.

Witnesses

Inventor
George W. Lewis
by Dayton, Poole & Brown
his Attys (No Model.) 7 Sheets—Sheet 3.

G. W. LEWIS.
GAS OR VAPOR ENGINE.

No. 583,399. Patented May 25, 1897.

Witnesses

Inventor
George W. Lewis
by Dayton, Poole & Brown
his Attys (No Model.) 7 Sheets—Sheet 4.

G. W. LEWIS.
GAS OR VAPOR ENGINE.

No. 583,399. Patented May 25, 1897.

Witnesses
Wm. F. Henning
Wm. M. Rheem

Inventor
George W. Lewis
by Dayton Poole & Brown
his Attys (No Model.) 7 Sheets—Sheet 5.
G. W. LEWIS.
GAS OR VAPOR ENGINE.

No. 583,399. Patented May 25, 1897.

Witnesses
Wm. J. Hanning
Wm. M. Rheem

Inventor
George W. Lewis
by Dayton, Poole & Brown
his Attys (No Model.) 7 Sheets—Sheet 6.

G. W. LEWIS.
GAS OR VAPOR ENGINE.

No. 583,399. Patented May 25, 1897.

Fig. 16

Witnesses
L. Clinton Hamblin
Harold G. Barrett

Inventor
George W. Lewis
by: Poole & Brown
his Attorneys

UNITED STATES PATENT OFFICE.

GEORGE W. LEWIS, OF CHICAGO, ILLINOIS.

GAS OR VAPOR ENGINE.

SPECIFICATION forming part of Letters Patent No. 583,399, dated May 25, 1897.

Application filed July 15, 1895. Serial No. 555,974. (No model.)

*To all whom it may concern:*

Be it known that I, GEORGE W. LEWIS, of Chicago, in the county of Cook and State of Illinois, have invented certain new and useful Improvements in Gas or Vapor Engines; and I do hereby declare that the following is a full, clear, and exact description thereof, reference being had to the accompanying drawings, and to the letters of reference marked thereon, which form a part of this specification.

This invention relates to improvements in explosive gas or vapor engines, and it includes improvements in such engines in several particulars, as will hereinafter appear.

The invention is herein shown as embodied in a gas-engine of that type known as a "single-acting" engine and one in which an explosion or impulse takes place at every revolution of the crank-shaft. The engine illustrated, moreover, is of that form in which is employed, in connection with the main or power cylinder, an air-compression chamber or inclosure in communication with the end of the cylinder opposite to that in which explosion takes place and within which air is compressed at each forward or power stroke of the piston preparatory to its admission to said cylinder. The engine illustrated is also provided with means for keeping cool the power-cylinder, comprising a water-tank in communication with the water-jacket of the cylinder, and means for condensing the steam or vapor from the water-tank. The engine illustrated is also provided with a muffling device for the exhaust-pipe thereof by which exhaust takes place without objectionable noise.

In the accompanying drawings, illustrating my invention.

As illustrated in said drawings, A indicates the power-cylinder of the engine, and B a piston therein which is connected with the crank-shaft C through the medium of a pitman D.

E is a chamber connected with one end of the cylinder and within which air is compressed in each forward or power stroke of the piston. Said compression-chamber B is herein shown as being connected directly with the open end of the power-cylinder and as extending therefrom around the crank-shaft and connecting-rod, so as to form a housing or inclosure for the same; but this particular construction in the compression-cylinder, which is not in itself new, is not essential to the carrying out of the features of my invention herein described, and the compression-chamber may be otherwise connected with the power-cylinder, as may be found convenient or desirable.

In the particular construction illustrated the chamber E consists of a main casing having apertures in its sides which are covered by separate plates E', on which are formed tubular bearings $e\ e$ for the crank-shaft C, the engine in this instance being shown as supported by means of horizontal bars $E^2$, which extend at opposite sides of the chamber E and to which the said chamber is secured by bolts, as shown. Said bars may form part of the supporting-frame of the vehicle, or they may be parts of any other supporting-framework.

The cylinder A is provided with admission-ports $a$, which are connected with the compression-chamber E through the medium of an air-supply passage, herein shown as formed by horizontal and vertical pipes $F\ F'\ F^2$. In said passage is located a check-valve $F^3$, which is conveniently located at the junction of the pipes $F\ F'$. For admitting air to the compression-chamber E a valved inlet is provided, the same being herein shown as located at the end of the depending pipe $F^4$, which forms a downward extension of the pipe F and is provided with a gravity-actuated check-valve $F^5$. In this construction air enters the chamber E through the valve $F^5$, the pipe $F^4$, and branch pipe $F^2$ at each backward or up stroke of the piston B, and the air is delivered from said chamber E through said branch pipe $F^2$ and the pipes F and F' to the upper end of the power-cylinder at the end of each forward or power stroke of the said piston.

Figure 1:
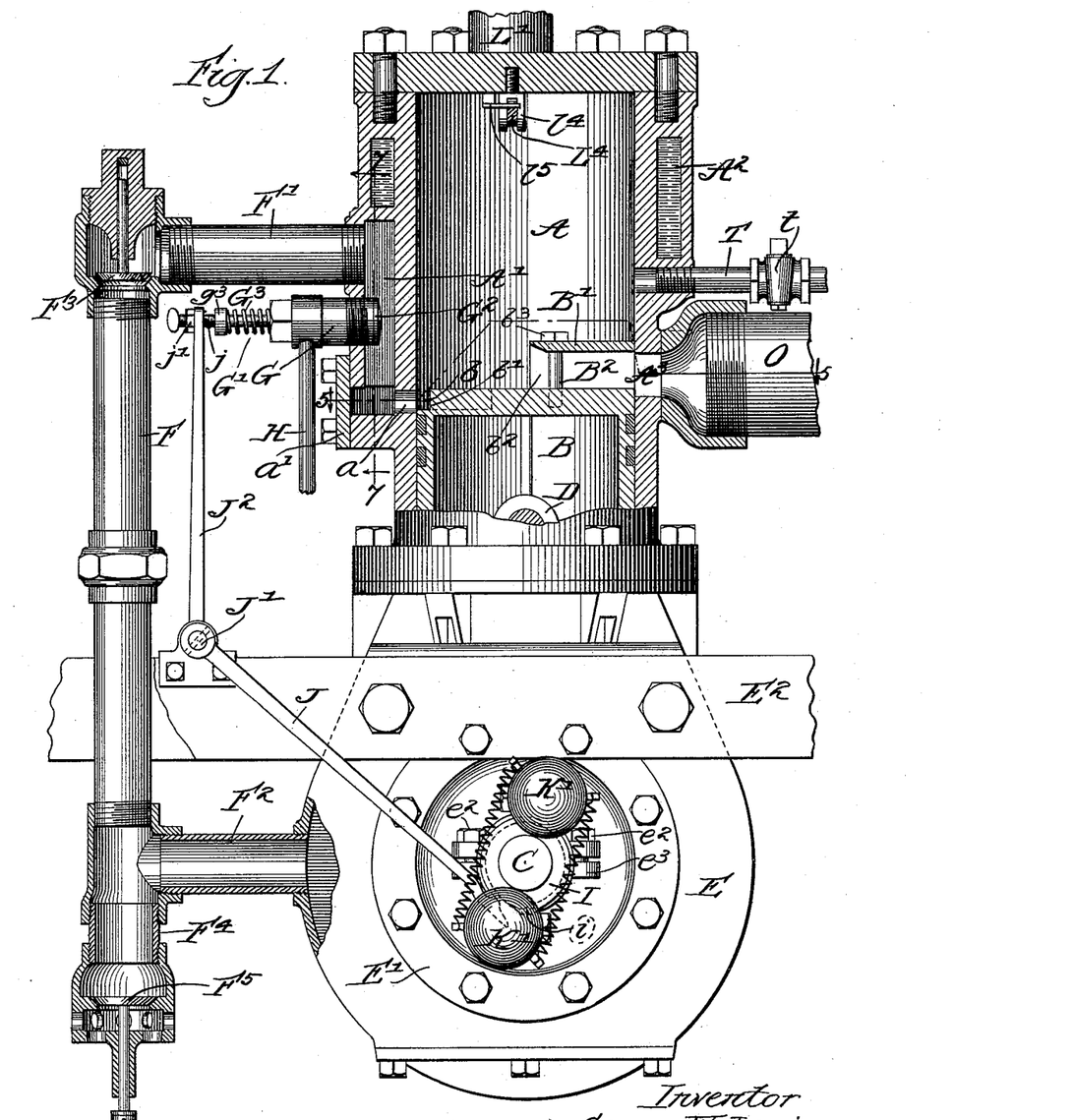
Figure 1 is a view, partly in central vertical section and partly in side elevation, of an explosive-engine embodying my invention, the same being illustrated in upright or vertical form.
Figures 2, 3, 4:
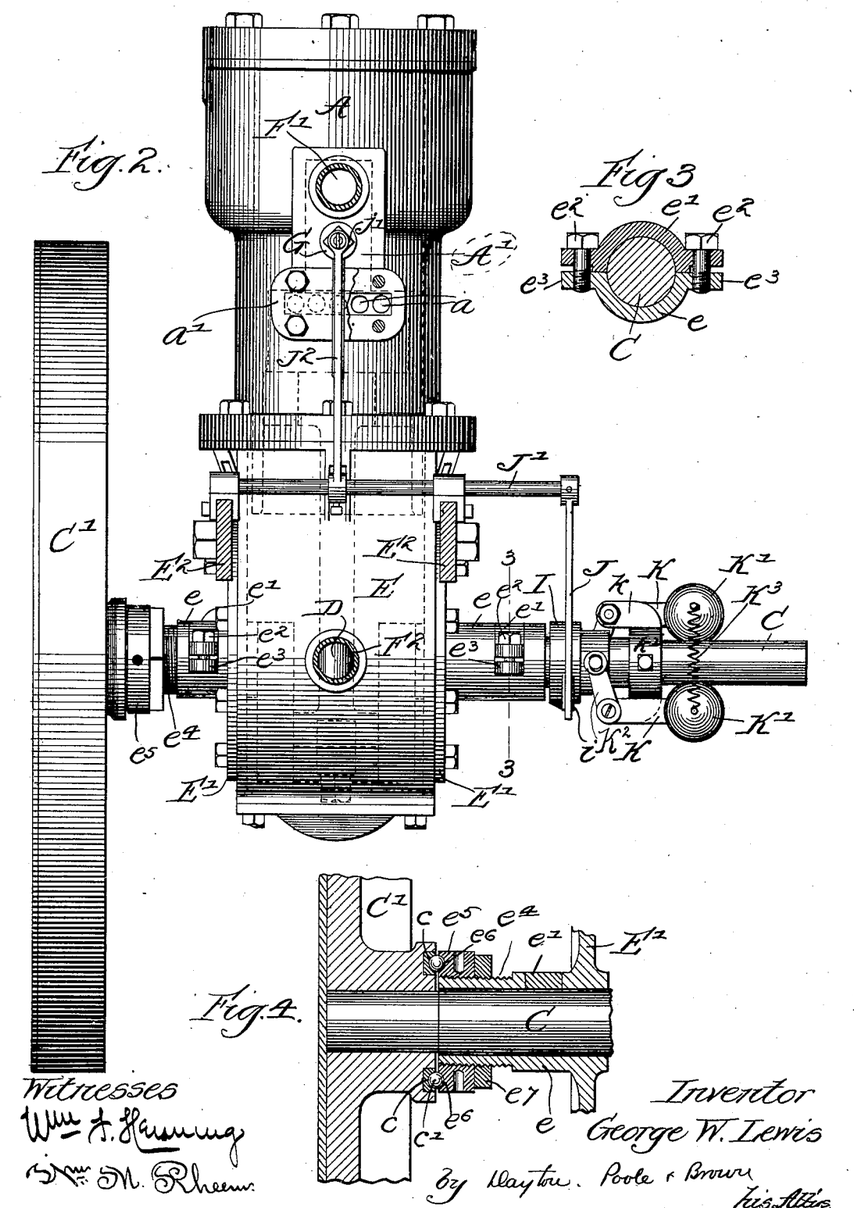
Fig. 2 is a view in side elevation of the engine.
Fig. 3 is a detail section through one of the crank-shaft bearings, taken on line 3 3 of Fig. 2.
Fig. 4 is a view in longitudinal section of the other of the crank-shaft bearings, showing antifriction-rollers adapted to take the end thrust of the shaft.
Figure 6:
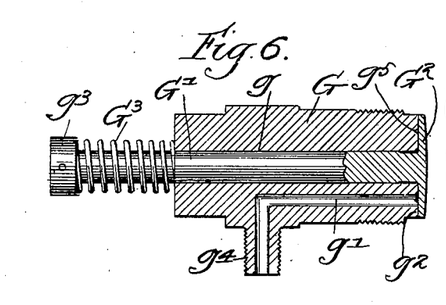
Fig. 6 is a detail section of the feeding-valve for the explosive liquid illustrated in Figs. 1 and 2.
Figure 7:
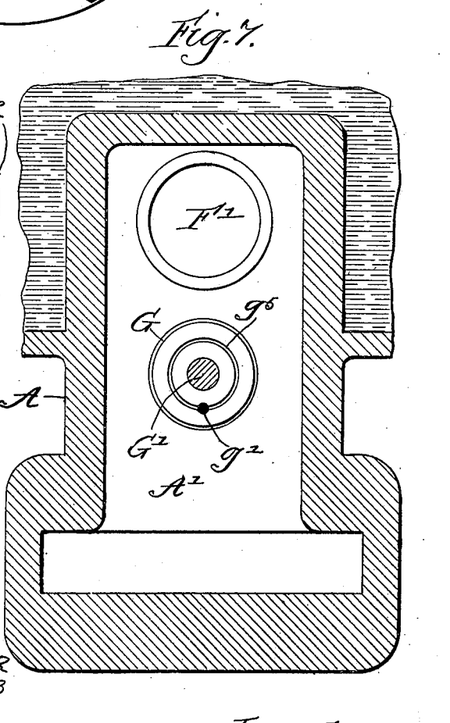
Fig. 7 is a detail section taken through the feeding chamber or passage on line 7 7 of Fig. 1.

The pipe F' communicates with the inlet-ports $a$ of the cylinder by means of a vaporizing passage or chamber A', located at the side of the power-cylinder and extending from the said inlet-port $a$ along the side wall of the cylinder toward that end of the cylinder in which the explosion takes place. Secured in the outer wall of the chamber A' and extending into said passage is a delivery-valve G, constructed for the delivery of liquid to the said chamber. Said valve forms part of a device by which the liquid is delivered in an atomized condition to the said chamber A'. This mechanism, which constitutes an important feature of my invention, is constructed as follows:

Referring to the form of device illustrated in Figs. 1, 2, and 6, said valve G consists of a tubular plug, which is inserted in the wall of the passage and is provided with a central passage $g$, within which is located a longitudinal sliding stem G', and also with a supply-passage $g'$, which extends through the plug G and terminates at the inner face $g^2$ thereof. Said inner face $g^2$, as shown in said Fig. 6, is made flat and is covered by a disk or closure $G^2$, which is secured to the inner end of the stem G'. Said disk $G^2$ forms the valve plate or closure for the end of the passage $g'$, but it performs another function, as will hereinafter appear. On the outer end of the stem G' is secured a collar $g^3$, and between said collar and the outer end of the plug is located a coiled spring $G^3$. The passage $g'$ is connected with a supply-pipe H, which leads from the supply-tank or other source of supply for gasolene or other liquid hydrocarbon. The pipe H is herein shown as connected with a nipple $g^4$, which extends from one side of the plug G and through which the passage $g'$ extends.

An actuating mechanism for the supply device described is provided as follows: On the crank-shaft C is mounted a collar I, having upon it a cam projection $i$. The cam projection is adapted to engage the end of a lever J, which is attached to a rock-shaft J', carrying a second lever-arm $J^2$, which is adapted to bear at its free end against the outer end of the stem G'. For purpose of adjustment contact with the said stem is secured through the medium of a set-screw $j$, which is movably secured in the end of the lever-arm J by means of a jam-nut $j'$. In the rotation of the crank-shaft the lever-arms J J' are oscillated by the action of the cam, so as to alternately thrust the stem G' and the valve-plate $G^2$ inwardly and to permit their retraction by the spring $G^3$. The cam projection $i$ is so shaped as to permit a very quick or sudden action of the spring in the retraction of the valve stem and plate. In the operation of this mechanism the valve-plate is held free from the plug during a very short period of time, and the passage $g'$ being small but a small quantity of the gasolene is permitted to escape during the time the said passage is open, the quantity being only a few drops and not more than will remain by capillary action adherent to the face of the plug or will remain between the face of the plug and the face of the disk, which is moved only a short distance inwardly therefrom.

To aid in holding the gasolene by capillary action, the face of the plug is preferably provided with an annular groove $g^5$, but this is not absolutely essential. The effect of the sudden or quick retraction of the valve-disk is to force or throw outwardly the liquid held between it and the end of the plug in the form of fine particles or atoms. The movement of the plate is so quick as to give the liquid no time to flow out from beneath it, so that it is ejected forcibly, and thereby broken up into fine particles or atomized. The passage A' being formed immediately adjacent to the side wall of the cylinder is subjected to the heat from the cylinder, and the atomized liquid being thrown into the hot space or against the heated walls of the passage the particles become immediately vaporized and the necessary vapor for admixture with the air to be supplied to the cylinder is thus produced without the use of any additional vaporizing devices. The action of the cam $i$ is so timed that the discharge of the liquid takes place before the air is discharged from the compression-chamber into the power-cylinder, so that the atomized liquid will have been converted into the form of vapor by the heat within the passage before the compressed air passes through said passage on its way to the said cylinder. It follows, therefore, that the liquid is converted into the form of vapor before it is swept with the air into the cylinder.

Figure 11:
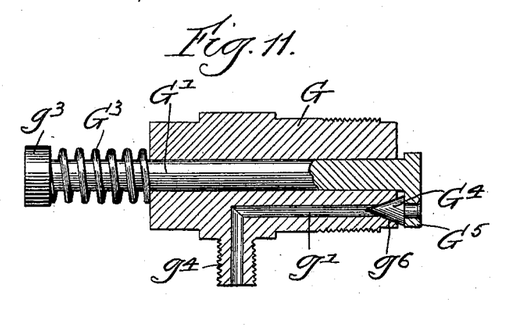
Fig. 11 illustrates in central longitudinal section a modified form of the atomizing-valve for feeding the liquid to the engine.
Figure 12:
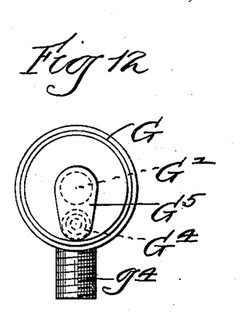
Fig. 12 is an end view of the valve shown in Fig. 11.

A vaporizing device for the liquid employed in the engine embracing the principles of operation above described may be constructed in a variety of forms—as, for instance, in Fig. 11 is illustrated a modification of the devices above set forth, wherein the plug G contains a passage $g'$, terminating in a conical orifice $g^6$, within which fits a conical plug $G^4$, attached to the arm $G^5$ on the stem $G'$. This device operates in the same manner as the one before described, the retraction of the plug $G^4$ permitting a small quantity of gasolene to exude upon the sides of the tapered orifice $g^6$ and the sudden return of the plug forcing out the liquid in the form of atoms or spray, which is thrown obliquely outward in a direction determined by the taper of the plug and orifice. The use of conical contact-surfaces for the stationary and movable members of the spraying device has the advantage of casting the spray forward and against the inner or heated wall of the passage $A'$ when the nozzle is arranged as illustrated in Fig. 11.

Figure 13:
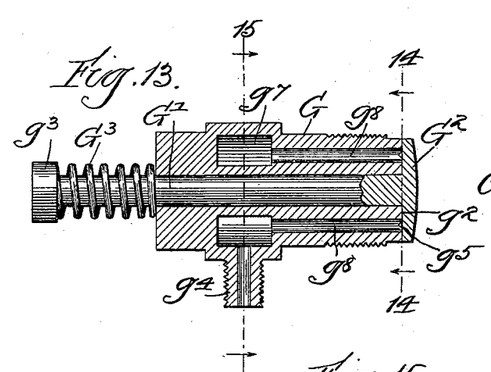
Fig. 13 is a sectional view of the valve adapted for the feeding of gas instead of hydrocarbon in liquid form.
Figure 14:
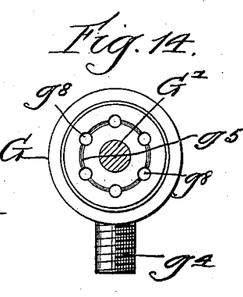
Fig. 14 is a sectional view of the same, taken on line 14 14 of Fig. 13.
Figure 15:
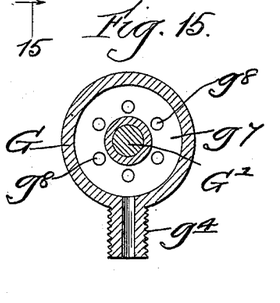
Fig. 15 is a sectional view taken on line 15 15 of Fig. 13.

In Figs. 13, 14, and 15 the plug is shown as provided with a stem $G'$ and valve-plate $G^2$ in the same manner as before described. In this instance, however, the supply-pipe communicates with an annular chamber $g^7$ in the outer part of the plug G, and a plurality of passages $g^8$ $g^8$ extend from the chamber to the flat face $g^2$ of the plug. This construction is adapted for giving a more abundant supply of liquid for larger engines, the quantity of liquid ejected into the passage being obviously much greater in this construction than in one where only a single passage is employed. A valve made as shown in Figs. 13 to 15 is obviously applicable for use as a gas-valve in engines using gas instead of liquid as an explosive agent. Said cylinder is provided at its working end, or at that end in which the charge is exploded, with an external cylinder or jacket $A^2$, forming the usual water-space for the circulation of water to absorb the heat generated by the explosions taking place within the cylinder. The passage $A'$ is shown as made at its upper part integral with the cylinder-walls, while at its lower part it is provided with a removable cap $a'$, which may be removed to obtain access to the inlet-ports $a$. The upper part of the passage $A'$ extends into the space which would otherwise be occupied by the water-jacket, and the inner wall of said passage is formed by the wall of the cylinder, so that heat from the interior of the cylinder will be transmitted directly to the said passage, thus maintaining the same at a maximum temperature for the purpose of vaporizing the spray thrown into the same from the spraying feed-nozzle, as hereinbefore described. The air-supply pipe $F'$ is shown as connected with the upper end of the passage $A'$, or the end thereof remote from the ports $a$, while the feeding-valve G is inserted in the passage between the air-supply pipe and the inlet-ports, so that air entering from the air-supply pipe will be drawn past or over the valve in its movement through the passage to the said ports.

Figure 5:
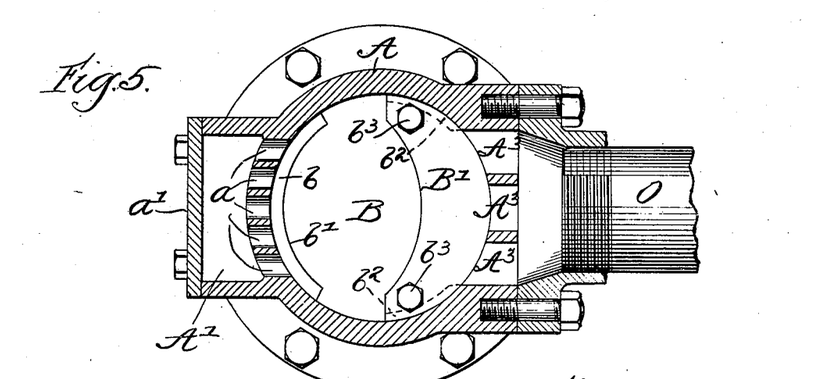
Fig. 5 is a horizontal plan section taken through the power-cylinder on the line 5 5 of Fig. 1.
Figure 8:
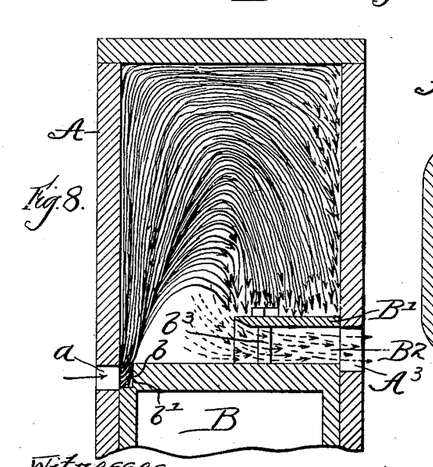
Fig. 8 is a sectional view of the cylinder, illustrating the course of movement of the explosive mixture in entering the cylinder.
Figure 9:
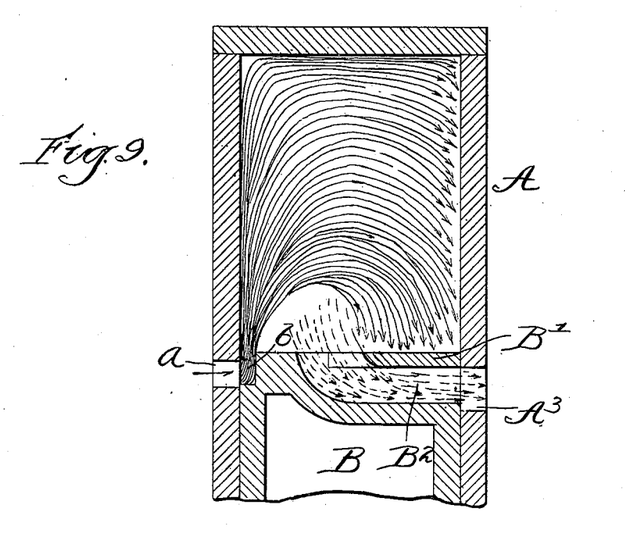
Fig. 9 is a view similar to Fig. 8, illustrating a somewhat different construction in the piston of the power-cylinder.

The piston B covers the inlet-ports $a$ $a$ except when said piston is at or near the end of its outward stroke, as clearly seen in Figs. 1, 8, and 9. Said piston is provided with a marginal angular recess or rabbet $b$, as best seen in Figs. 1 and 5, which recess is arranged to come opposite the inlet-ports $a$ when the cylinder is at the end of its power-stroke. The rear wall $b'$ of said recess is made abrupt or approximately parallel with the cylinder-wall, so as to deflect the incoming admixture of gas and air toward the cylinder-head in the manner indicated by the arrows in Fig. 8.

The exhaust-port $A^3$ of the cylinder is arranged at the opposite side of the cylinder from the inlet-ports and is so arranged as to be uncovered by the piston before the inlet-ports are opened.

I propose as a further and separate improvement to provide the piston with a plate or wall $B'$, which constitutes the top surface of the piston at its side adjacent to the exhaust-port and which forms with the adjacent portion of the piston below it a passage $B^2$, through which the spent or dead gases resulting from the previous explosion pass in making their escape through the exhaust-port, said plate $B'$ being so arranged as to rise above the level of the exhaust-port when the piston is at the outward limit of its movement or stroke, or in the case of a horizontal cylinder at the side of the said exhaust-port nearest the power-head of the cylinder. The purpose of this construction is to lessen the liability of escape of any portion of the explosive mixture as it enters the cylinder, while increasing the probability of the escape of all of the dead gases resulting from the last explosion, as will be clear from the arrows indicating the direction taken by the mixture as it enters the cylinder, Fig. 8. It will be seen that the mixture will be forced toward the cylinder-head and will gradually fill the cylinder from its head toward the piston, while that part of the mixture first entering after coming in contact with the cylinder-head will be deflected toward the piston at the side of the cylinder opposite the inlet-ports, it being obvious that the portion of the mixture first reaching the vicinity of the exhaust-port would pass out through the same were it not for the presence of the said plate $B'$, which latter serves to arrest the mixture and retain it in the side of the cylinder opposite the inlet-opening until practically all of the dead gases have been forced through the passage $B^2$. The opening of said passage $B^2$ is located at the region which is last reached by the mixture in entering the cylinder, this region being the portion of the space within the cylinder adjacent to the entering stream, which passes along the side of the cylinder and near the piston.

As illustrated in Figs. 1 and 5, the plate B' is supported at some distance from the inner face of the piston, by means of flanges $b^2$, formed on the end portions of the plate and constituting the side walls of the passage $B^2$, the plate being held in contact with the piston by bolts $b^3$, Figs. 5 and 8.

Figure 10:
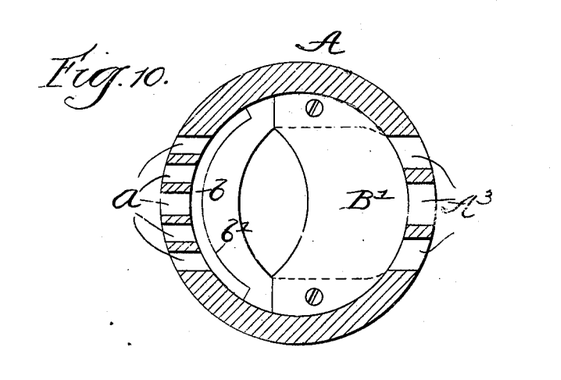
Fig. 10 is a sectional view of the cylinder, showing the top of the piston in plan view.

Another and for some reasons a preferable construction of the piston is illustrated in Figs. 9 and 10. In this instance the plate B' is located in the same plane with the end surface of the piston, and the passage $B^2$ is formed by a depression in the end face of the piston. Said depression is bridged by the said plate B', which latter may be either cast integral with the other parts of the piston or secured thereto in a suitable way, as by screws, in the manner illustrated.

A governing device is provided for the engine as follows: The collar I, which gives motion to the closure of the supply or inlet valve described, is arranged to slide endwise on the shaft C while turning with the same, and a centrifugally-acting governor is provided, arranged to move or shift said sleeve endwise on the shaft. The cam projection is made with a working face of some width, and such working face is inclined, so that when the sleeve is shifted endwise on the shaft the arm J will be moved to a less extent and the valve opened a correspondingly shorter distance when the desired speed is exceeded. When the speed of the engine is reduced to its normal rate, the sleeve is returned to its normal position, and the feeding is resumed with the same extent of valve-opening as before. The governing device illustrated consists of pivoted governor-levers K, which are mounted on arms $k$, which are rigidly attached to a collar $k'$ on the shaft, said levers being provided with centrifugal weights K' at their free ends and having inwardly-extending arms which are united with the sleeve I by slot-and-pin connections, by which the oscillatory movement of the governor-levers is transmitted to the said sleeve. Contractile coiled springs $K^3$ connect the governor-weights with each other and tend to hold the same at the inward limit of their movement.

Inasmuch as the compression-chamber E contains air under pressure, it is desirable that the shaft C should fit closely within the bearings $e$ $e$, through which it passes from the interior of the chamber, and in order to insure that such close fit of the shaft within these bearings shall be always maintained, notwithstanding wear of the parts, I provide in each of the tubular bearings a separate movable plate or cap $e'$, which fits within and fills a recess formed in the bearing and forms the contact-surface of the bearing for a portion of the length of the same. Said cap is adjustably secured in place by means of bolts $e^2$ $e^2$, which engage outwardly-projecting lugs $e^3$ on the bearing-sleeve, said bolts enabling the caps to be tightened against the shaft in case the parts become loose by wear. The caps thus constructed serve to insure circumferential contact of the shaft with the bearing at the points where the caps are located, even though the shaft may fit somewhat loosely in the bearing-surface at other points. Said caps are fitted closely at their side margins against the openings in the bearings, so as to prevent the escape of air at the side margins of the cap.

The shaft C is shown as provided at one end with a disk C', which forms a balance-wheel and also one member of a friction-gear, such as is used in vehicles for connecting the engine driving-shaft with the vehicle driving-wheel. In case such a friction-disk is used when the engine is used for giving motion to the propeller-shaft of a vessel and in other like circumstances the end thrust on the shaft is likely to produce undesirable end friction on the shaft-bearings, and I have provided in the construction shown an anti-friction-bearing especially adapted for an engine of this character.

As more clearly seen in Figs. 2 and 4, the tubular bearing $e$ at the side of the engine nearest the disk C' is provided with a screw-threaded extension $e^4$, upon which is placed a screw-threaded ring $e^5$, having on its outer face a groove $e^6$, arranged opposite a corresponding groove $c$ on the hub of the disk C'. Within the grooves $e^6$ and $c$ are placed anti-friction-balls $c'$. The ring $e^5$ is provided with holes for a spanner-wrench or is otherwise arranged to be turned on the extension $e^4$, while a jam-nut $e^7$ is applied to the said screw-threaded part for holding the ring from turning after it has been properly adjusted. By adjustment of said ring $e^5$ the thrust may be taken entirely from the bearing-shoulders of the crank-shaft, while at the same time the smooth and easy running of the engine is greatly increased through the use of antifriction balls or rollers.

Figure 16:
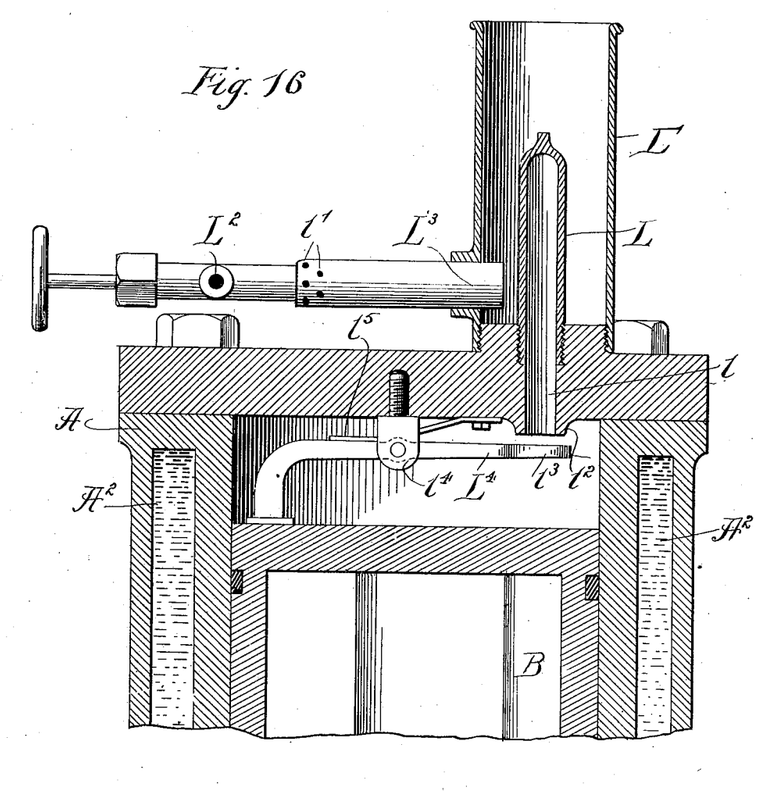
Fig. 16 is a sectional view through the upper part of the power-cylinder, showing a tubular igniting device.

An igniting device for exploding the mixture within the cylinder is illustrated in the accompanying drawings, the same being of that form in which ignition is effected through the medium of a tube the interior of which is in communication with the interior of the cylinder and which is maintained in a heated condition by the external application of heat. The device referred to is shown in Fig. 16 of the accompanying drawings. As illustrated in said figure, L indicates a tube closed at its outer end and attached to the cylinder at its inner end, the interior of the tube being in communication with the cylinder-head by means of a passage $l$ in the cylinder-head. The part of the tube outside of the head is surrounded by a housing L', with which is connected a gas or vapor supply pipe $L^2$, terminating in a burner $L^3$, adjacent to which is formed an air-inlet $l'$, by which a mixture of gas or vapor and air is delivered to the burner and is burned within the housing around the tube *l*. At the inner end of the passage *l* the cylinder-head is provided with an inwardly-extending rib or flange *l²*, forming a valve-seat, and opposite said valve-seat and adapted for contact therewith is located a valve-disk *l³*, attached to a spring-actuated lever L⁴. Said lever is pivoted in a bracket *l⁴*, secured to the cylinder-head, and is held by a spring *l⁵* in position to maintain the valve-disk in contact with the valve-seat. The end of the lever L⁴ opposite the valve-disk is directed inwardly or toward the opposite end of the cylinder and is adapted for contact with the end of the piston B. These parts are so arranged that the valve-disk rests against its seat and cuts off the communication between the interior of the ignition-tube and the cylinder except when the piston reaches the inward limit of its stroke and actuates the lever to lift the valve-disk, at which time the mixture of air and vapor, which is held under compression in the end of the cylinder, rushes into the tube and is ignited by contact with the heated walls of the latter.

As a still further improvement in explosive-engines intended to facilitate the starting of the same in action I propose to provide the power-cylinder with an outlet pipe or passage provided with a valve or stop-cock adapted for actuation by hand and placed in position convenient for the operator. Such a passage is shown in Fig. 1 in the form of a pipe having a plug-valve *t*. The purpose of such pipe or passage is to temporarily relieve the pressure within the power-cylinder, so that the crank-shaft may be more easily turned by hand in starting the engine, it being obviously difficult to start the engine by hand when it is necessary to compress the full charge of air in the cylinder preparatory to the first explosion therein. It is of course obvious that the escape of part of the explosive mixture from the cylinder will merely result in the lessening of the power required to compress the charge without so greatly diminishing the amount of the charge as to prevent an explosion sufficient to start the engine. The relief pipe or passage T will preferably be placed at a considerable distance from the power-head of the cylinder, so that the passage through which it communicates with the cylinder will be covered by the piston when the charge is compressed and when explosion takes place. The location of said passage, moreover, determines the amount of the mixture which will escape before compression takes place. Thus in the construction illustrated the passage is so located that about one-half of the contents of the cylinder may escape therefrom before the passage is closed by the advancing piston.

Figure 17:
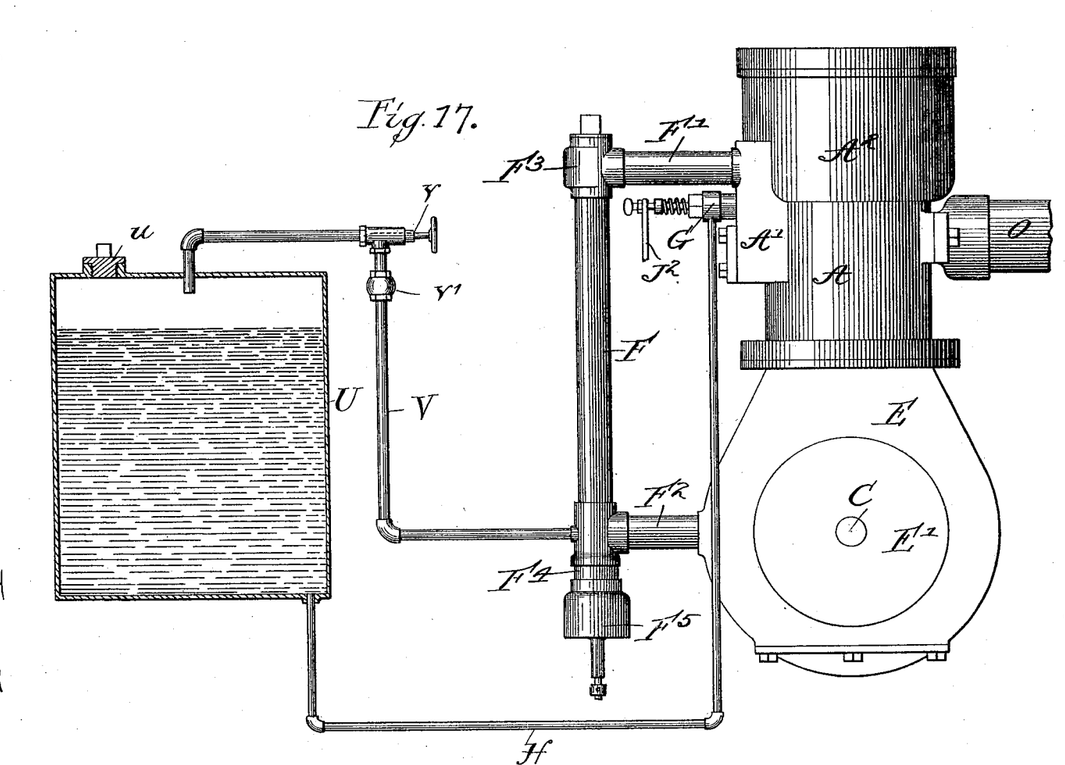
Fig. 17 is a view illustrating the engine in side elevation, together with means for supplying liquid fuel thereto.

As an improved means of feeding the gasolene or other liquid to an explosive-engine adapted for use in connection with an engine used as a vehicle-motor and under other circumstances I have provided a construction as follows, the same being illustrated in Fig. 17; as shown in said Fig. 17, U indicates a tank for the liquid which is closed at its top and is preferably provided with a filling-orifice *u*, made tight by a suitable closure. With the bottom of the tank is connected a supply-pipe H, which leads to the valve G, through the medium of which the liquid is supplied to the engine-cylinder.

V indicates a pipe extending from the top of the tank U and communicating with the air-compression chamber E. Said pipe V is for convenience shown as connected with the pipe F, but the result would obviously be the same whether connected with said pipe F or directly with the air-chamber. The pipe V contains a valve *v*, adapted for actuation by hand, and also a check-valve *v'*, which opens toward the tank U.

The tank U will commonly be located below the level of the engine-cylinder, and the apparatus illustrated is for the purpose of forcing the liquid from said tank to its point of discharge to the cylinder or carbureting apparatus. It is, however, obvious that in cases where the tank may be located at a sufficient distance above the engine to give the necessary pressure no such apparatus will be required.

The parts being arranged as described and the hand-valve *v* opened it is obvious that air from within the compression-chamber E will be forced through the pipe V, past the check-valve, and into the tank U at each advance of the piston, so that after a few strokes of the piston the air will become compressed in the tank to the maximum pressure within the compression-chamber, any backward escape of air from the tank being prevented by the check-valve *v'*. The liquid in the tank will thus be maintained under a practically uniform and constant pressure, by which it will be fed through the pipe H. The hand-valve *v* may be used to close the pipe V to certainly prevent escape of air from the tank when the engine is not in use, but the use of such hand-valve is not essential in operation of the device, because the check-valve will always prevent backward passage of air from the tank through said pipe V. I prefer to use said hand-valve, however, so that the pipe V may be positively closed when the engine is stopped to retain the liquid in the tank under sufficient pressure for operation at any time and also to avoid the possibility of the backward escape of any vapor from the tank to the air-compression chamber.

The feeding device described is obviously of great value for use in connection with vehicle-motors or under other circumstances where it is not convenient to employ an elevated liquid-feeding tank. It is, moreover, obvious that the feeding device described may be employed in connection with engines having carbureting devices of other forms than that illustrated.

I claim as my invention—

1. The combination with a power-cylinder provided with air inlet and exhaust ports, of a vaporizing-chamber which is located contiguous to the side wall of the cylinder and one wall of which is formed by the wall of the cylinder, so that said chamber is heated from the cylinder, a compression-chamber in which air is compressed by the piston in its power stroke, an air-supply passage leading from said compression-chamber to the vaporizing-chamber, and a valved passage for delivering liquid to the said vaporizing-chamber, substantially as described.

2. An explosive-engine comprising a power-cylinder, a piston therein, said power-cylinder being provided with inlet and exhaust ports which are uncovered by the piston at the limit of its power stroke, said piston being provided with a passage extending from the end surface of the piston to the side thereof at which the exhaust-port is located, and through which the waste gases pass on their way to the exhaust-port substantially as described.

3. As a means of delivering liquid to an explosive-engine, a valve provided with a small passage affording passage of the liquid in minute quantities, a movable closure for the mouth of said passage, and means for giving reciprocatory motion to said closure constructed to bring the same forcibly and quickly against its seat, whereby the liquid is atomized, substantially as described.

4. The combination with a power-cylinder, provided with an air-inlet port, of a vaporizing-chamber connected with said port, an air-supply passage leading to the said vaporizing-chamber, means for delivering liquid to the said vaporizing-chamber embracing a valve provided with a small passage, affording passage for liquid in minute quantities, a closure for the mouth of said passage, and means for reciprocating the closure constructed to quickly and forcibly close the same to expel the liquid at the mouth of the passage in atomized form into the said vaporizing-chamber, substantially as described.

5. The combination with a power-cylinder provided with an air-inlet port and with a piston which uncovers the air-inlet port when at the limit of its power stroke, said cylinder being provided with a vaporizing-chamber, one wall of which is formed by the side wall of the cylinder and which communicates with said inlet-port, an air-compression chamber, an air-supply passage leading from the air-compression chamber to the said vaporizing-chamber and a valve for delivering liquid to the said vaporizing-chamber, said valve opening into the chamber between the air-passage and the inlet-port and being provided with a passage for the liquid, a closure for the mouth of said passage and means for reciprocating the closure to expel the liquid at the mouth of the passage in atomized form into said vaporizing-chamber, substantially as described.

6. The combination with a power-cylinder, a piston therein, and a crank-shaft actuated by the piston, of a compression-chamber connected with one end of the cylinder and provided with integral tubular bearings for the crank-shaft on its side walls, said tubular bearings being provided with lateral slots or openings and with movable caps filling said slots or openings, and adjustably secured to said tubular bearings whereby tight joints may be maintained to prevent escape of air through the bearings, substantially as described.

7. The combination with an explosive-engine having a power-cylinder and an air-compression chamber, which supplies air under pressure to said cylinder, of a tank for liquid, a supply-pipe leading from the bottom of the tank to the engine, and an air-pipe leading from the compression-chamber to such tank, said air-pipe being provided with a check-valve, substantially as described.

In testimony that I claim the foregoing as my invention I affix my signature, in presence of two witnesses, this 12th day of July, A. D. 1895.

GEORGE W. LEWIS.

Witnesses:
C. CLARENCE POOLE,
ALBERT H GRAVES.